United States Patent [19]

Tsuchiya

[11] Patent Number: 5,201,891
[45] Date of Patent: Apr. 13, 1993

[54] VIBRATION PARTS ALLIGNMENT APPARATUS

[75] Inventor: Teruo Tsuchiya, Iruma, Japan

[73] Assignee: Myotoku Ltd., Tokyo, Japan

[21] Appl. No.: 836,168

[22] Filed: Feb. 18, 1992

Related U.S. Application Data

[63] Continuation of Ser. No. 445,630, Dec. 27, 1989 filed as PCT/JP89/00202, Feb. 28, 1989, abandoned.

[30] Foreign Application Priority Data

Feb. 28, 1988 [JP] Japan .................................. 63-45556
Apr. 17, 1988 [JP] Japan .................................. 63-93699

[51] Int. Cl.⁵ .............................................. B65G 47/24
[52] U.S. Cl. .............................................. 198/383
[58] Field of Search ............ 198/382, 383, 389-391, 198/396; 221/157

[56] References Cited

U.S. PATENT DOCUMENTS 2,990,935 7/1961 Bailey .................................. 198/383
3,417,856 12/1968 O'Brien et al. ..................... 198/396

FOREIGN PATENT DOCUMENTS 42-14424 8/1967 Japan .
43-28814 11/1968 Japan .
52-9019 3/1977 Japan .
60-218216 10/1985 Japan .

Primary Examiner—Joseph E. Valenza
Attorney, Agent, or Firm—Armstrong, Westerman, Hattori, McLeland & Naughton

[57] ABSTRACT

This invention relates to a vibration parts alignment apparatus capable of aligning parts or vibrated objects 40 with a multiplicity of alignment holes 31 formed in a parts alignment tray 30 in a very short period of time by vibrating the parts alignment tray 30 with a vibration generator 10 while inclining the same reciprocatively with an inclining device 20.

3 Claims, 3 Drawing Sheets

VIBRATION PARTS ALLIGNMENT APPARATUS

This application is a continuation of application Ser. No. 445,630, filed Dec. 27, 1989, filed as PCT/JP89/00202, Feb. 28, 1989, now abandoned.

DESCRIPTION

1. Technical Field

This invention relates to vibration parts alignment apparatus and, more particularly, to a vibration parts alignment apparatus for aligning a multiplicity of parts in alignment holes of a parts alignment tray by vibrations and reciprocative inclining motions.

2. Background Art

Conventionally, various types of vibration generators have been provided.

Apparatus for generating straight-line vibrations by repeating a reciprocative motion along one axis have usually been used as this kind of vibration generator.

More specifically, a type of vibration generator has been provided in which an eccentric motion caused by an eccentric cam fixed to the output shaft of a motor is converted into a repeated linear motion, and another type of vibration generator has been provided which effects a repeated linear motion by utilizing advancing and retreating operation of a cylinder based on magnetization and demagnetization of a solenoid.

These vibration generators have been used for transportation of material, sifting of parts in parts feeders as well as so called vibration sifting.

These conventional vibration generators are capable of simply generating vibrations but entail difficulty in application to a certain technical field since the direction of vibration is limited to on axial direction.

Recently, in particular, with reduction in parts size, automatized lines have been brought into use in which small parts are assembled on works by robots disposed along the assembly line.

This type of automatized line has entailed a need for constantly supplying parts to be used to a certain position to facilitate taking out the parts with a robot manipulator, or a need for aligning the parts in a parts alignment tray formed into a certain shape and making a robot manipulator successively take the parts out of the parts alignment tray to perform the assembly.

Conventionally, however, it is difficult for parts particularly small among various parts, e.g., lengthwise parts having a directionality, such as screws or pins having a smaller diameter, to be aligned in a parts alignment tray as well as to be supplied to a certain position. It is also difficult for thin washers or the like to be aligned in a part alignment tray as well as to be supplied one by one to a certain position.

It is therefore an object of the present invention to provide an arrangement in which a vibrator can vibrate a part alignment tray while being inclined, the part alignment tray having a multiplicity of alignment holes for alignment of parts is fixed to the vibrator, and lengthwise parts having a directionality, such as screws or pins having a smaller diameter, or thin parts such as washers are aligned in the alignment holes of the parts alignment tray, thereby enabling the parts to be aligned efficiently in a very short time.

DISCLOSURE OF THE INVENTION

The present invention provides a vibration parts alignment apparatus formed of a vibration generator and an inclining device for inclining the vibration generator, in which a parts alignment tray having a plurality of alignment holes for alignment of parts is formed to be capable of being fixed to the vibration generator. The inclining device and the vibration generator are operated simultaneously to make a vibrating member vibrate while inclining.

Accordingly, if a multiplicity of objects to be vibrated are placed on the parts alignment tray fixed to the vibrating member, the vibrated objects move on the vibrating member in accordance with the inclination created by the inclining device, receive vibrations caused by the vibrating device, and are fitted in the alignment holes of the parts alignment tray, thus being aligned in the alignment holes of the parts alignment tray.

In accordance with the present invention, inclining is effected along with the vibration, thereby enabling the vibrated objects to be uniformly positioned in the alignment holes of the parts alignment tray.

The vibrating member may be vibrated to produce vibration in accordance with the present invention, the vibrated objects are bounded by the vibration to be aligned, which is particularly effective in aligning lengthwise parts having a directionality, such as screws or pins having a smaller diameter.

Also, the vibrating member may be vibrated to produce lateral vibration, which is suitable for alignment of thin parts such as washers.

BEST MODE FOR CARRYING OUT THE INVENTION

Figure 1:
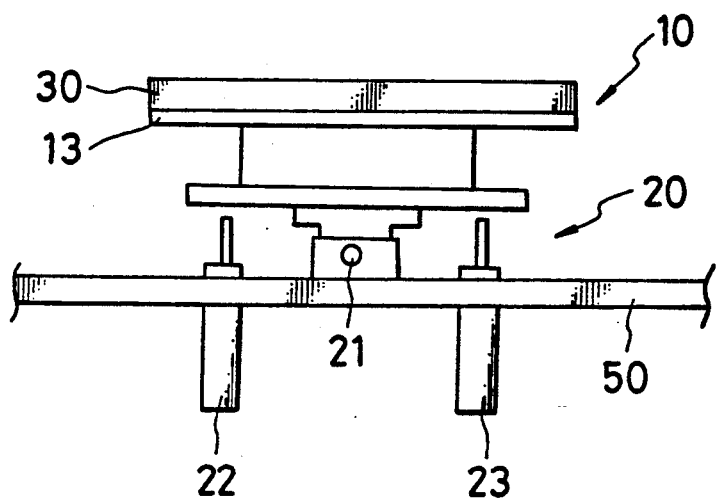
FIG. 1 is a front view of a vibration part alignment apparatus in accordance with an embodiment.
Figure 2:
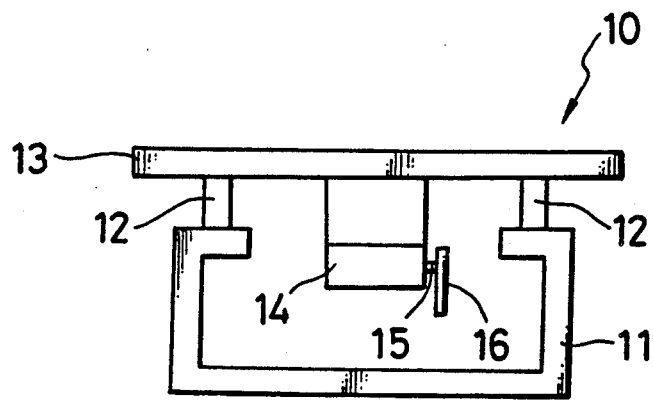
FIG. 2 is a detailed cross-sectional view of a vibration generator used in the vibration part alignment apparatus shown in FIG. 1.

Embodiments of the present invention will be described below with reference to the accompanying drawings. An embodiment first described exemplifies a case in which a vibration generator 10 generates vibrations in order to align lengthwise parts having a directionality, such as screws or pins of a small diameter, which parts are provided as vibrated objects 40.

This embodiment comprises an inclining device 20 fixed on a base frame 50, a vibration generator 10 axially supported by an inclination shaft 21 on the base frame 50, and a parts alignment tray 30 fixed to the vibration generator 10.

The inclining device is formed of two cylinders 22 and 23 mounted in the base frame with the inclination shaft 21 interposed between the cylinders 22 and 23.

The two cylinders 22 and 23 are constructed in such a manner that when the cylinder rod of one 22 of these cylinders is projected, the cylinder rod of the other cylinder 3 is not projected or, conversely, when the cylinder rod of the other cylinder 23 is projected, the cylinder rod of the cylinder 22 is not projected, and that the vibration generator 10 is inclined alternately to the left and to the right as viewed in the figure by the alternate projection of the two cylinders 22 and 23.

The vibration generator 10 is formed of a stationary frame 11 axially supported by the inclination shaft 21 on the base frame 50, a vibrating member 13 connected to the stationary frame 11 by flexible connecting members 12, a motor 14 fixed to the vibrating member 14, and an eccentric member 16 fixed to an output shaft 15 of the motor 14.

Each connecting member 12 is formed of a flexible material or member, such as a spring or a vibration proof rubber.

The motor 14 is positioned so that the output shaft 15 is parallel to the surface of the vibrating member 13. The rotation of the eccentric member 16 based on the rotation of the motor 14 causes the vibrating member 13 to oscillate in the direction.

The parts alignment tray 30 is fixed on the vibrating member 13.

Figure 3:
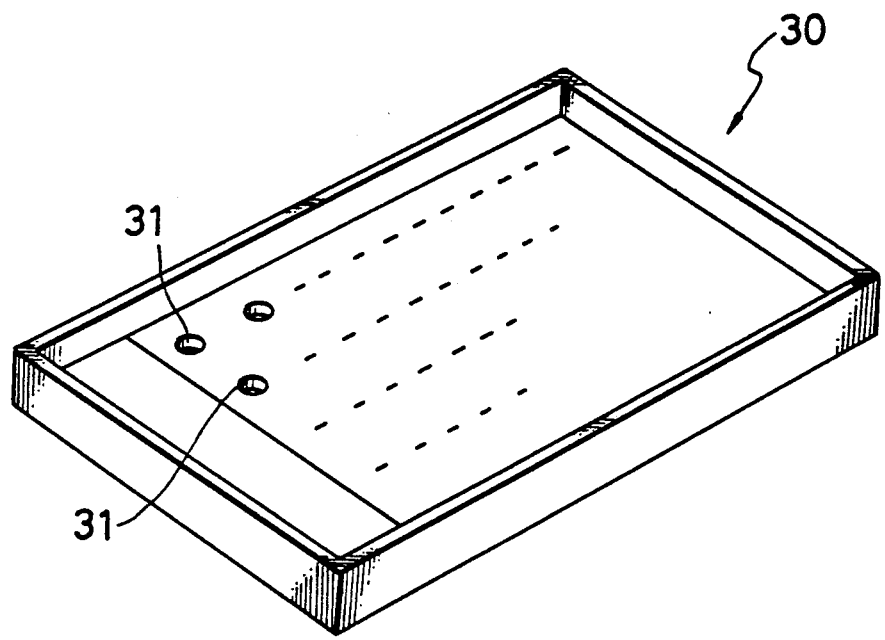
FIG. 3 is a perspective view of a parts alignment tray.
Figure 4:
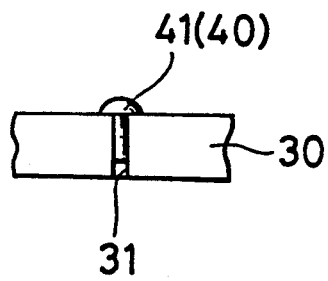
FIGS. 4 and 5 are different cross-sectional views showing the relationship between alignment holes and vibrated objects.

A multiplicity of alignment holes 31, such as those shown in FIG. 3, are formed in the parts alignment tray 30. In the illustration, the alignment holes 31 are comparatively enlarged for convenience sake, but, if the vibrated objects 40 are screws 41, the alignment holes 31 is formed to have a diameter slightly larger than the thread diameter of the screws 41 which are to be aligned.

The operation of the vibration parts alignment apparatus in accordance with this embodiment will be described below.

A preparatory state before the operation will be described first. The vibrating member 13 has an inclination on one side relative to the position indicated in FIG. 1 by pivoting on the inclination shaft 21.

The following description is made on the assumption that the direction of this inclination corresponds to the direction to the left as viewed in FIG. 1. It is also assumed that a multiplicity of screws 41 are provided as vibrated object 40 in the parts alignment tray 30 fixed to the vibrating member 13 of the vibrator.

In this state, the cylinder rod of the right cylinder 23 is projecting upward while the cylinder rod of the left cylinder 22 is retreated.

As the motor 14 is rotated in this state, the eccentric member 16 fixed to the output shaft 15 of the motor 14, and a load which acts to make the motor 14 effect a circular motion is applied to the motor 14 by the eccentric rotation of the eccentric member 16.

At this time, since the motor 14 is fixed to the vibrating member 13 and since the vibrating member 13 is in turn secured to the stationary frame 11 by the flexible connecting members 12, the vibrating member 13 repeats a small longitudinal circular motion by the load imposed on the motor 14 in the direction of the circular motion and by the effect of the flexibility of the connecting members 12 relative to the stationary frame 11 regarded as a stationary axis.

This small longitudinal circular motion acts as a source of vibration or the vibrating member 13.

While the motor 14 is being rotated for this effect, the cylinder rod of the left cylinder 22 is gradually projected and the cylinder rod of the right cylinder 23 is gradually retreated, thereby gradually moving the vibration generator 10 from the left-inclination state to the right-inclination state.

During the change in the inclining direction based on pivoting on the inclination shaft 21 for alternate change of the inclining direction, the vibrating member 13 repeats the fine vibration because the motor 14 continues rotating in the longitudinal direction.

Thereafter, the vibrating member 13 is inclined rightward inclination by pivoting on the inclination axis 21 as the cylinder rod of the cylinder 22 on the left-hand side of the figure is projected.

When the vibrating member 13 vibrates in the longitudinal direction in this way, the parts alignment tray 30 also vibrates finely since it is fixed to the vibrating member 13.

Fine vibrations of the parts alignment tray 30 thus produced cause vibrations of the screws 41 provided as vibrated objects 40 in the parts alignment tray 30 so that the screws 41 are bounded in the parts alignment tray 30.

The thread portions of some of the screws 41 are thereby fitted in the alignment holes 31.

The screws 41 fitted in the alignment holes 31 in this way do not jump out of the alignment holes 31 by longitudinal vibrations thereafter continued. It is therefore possible to position the screws 41 in all the alignment holes 31 by repeating the vibration and inclination.

Figure 5:
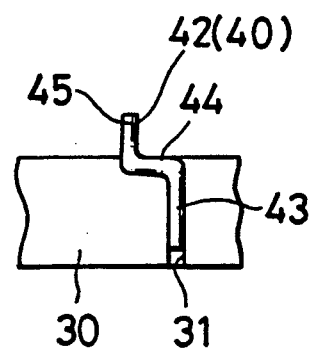

FIG. 5 shows a case of application to alignment of pins 42 having a crank-like shape, e.g., IC terminals.

In general, this type of pin 42 has a long shaft 43, a cranked portion 44 and a short shaft 45, and the pins 42 are usually aligned while positioning the short shaft 45 higher. In such a case, alignment holes 31 in which the long shaft 43 is fitted and grooves in which the crank portion 44 is fitted and which are formed continuously with the alignment holes 31 are formed in the parts alignment tray 30, as shown in FIG. 5, and alignment is effected with vibration.

Once the long shaft 43 is fitted in the alignment hole 31 during this vibration, the pin does not jump out of the alignment hole 31 by the vibration thereafter continued. If the short shaft 45 enters the alignment hole 31, the pin 42 jumps out of the alignment hole by the vibration thereafter continued. Finally, all the pins are aligned in the desired form.

That is, in the case where the pins 42 are aligned in the desired form in this way, it is necessary to produce the longitudinal vibration at an amplitude such that the short shaft 45 placed in the alignment hole 31 jumps out but the long shaft 43 placed in the alignment hole 31 does not jump out.

Figure 6:
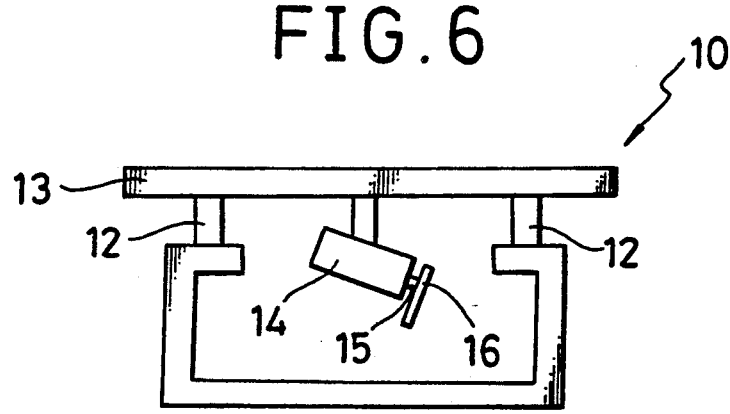
FIG. 6 is a front view of another embodiment based on the vibration parts alignment apparatus shown in FIG. 1.

Another embodiment shown i FIG. 6 relates to a case in which the vibration generator 10 generates vibrations in oblique directions, i.e., a combination of vibrations in the longitudinal and lateral directions in order to align lengthwise parts having a directionality, such as screws or pins of a small diameter or thin parts, such as washers, which parts are provided as vibrated objects 40.

In this case, the output shaft 15 of the motor 14 is inclined relative to the vibrating plate.

In this construction, the vibration of the vibrating plate is a mixture of vibrations in the longitudinal and lateral directions caused by the eccentric rotation of the motor 14.

If such vibrations take place, the vibrated objects 40 are bounded by the longitudinal vibration to be aligned with the alignment holes 31, and are gradually moved to the left or right by the inclining device 20 while being finely vibrated circularly because the lateral vibration becomes circular vibration in a plane which coincides with the surface of the parts alignment tray 30.

Figure 7:
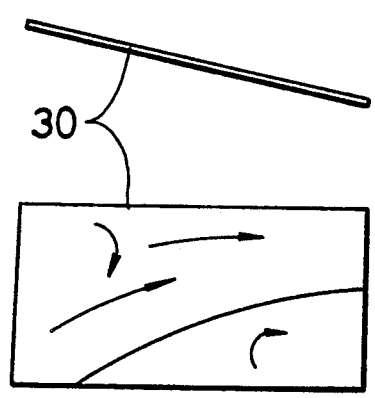
FIGS. 7 and 8 are diagrams showing flows of vibrated objects in the case where the vibration parts alignment apparatus shown in FIG. 6 is used.

In the case where this movement is a rightward movement, the vibrated objects 40 all of which are put together on a left-hand area of the vibrating member 13 before the start of the movement are gradually moved rightward as shown in FIG. 7 by the vibration during rightward inclination. If the lateral vibration of the vibrating member 13 is a clockwise rotation as shown in FIG. 7, the vibrated objects 40 tend to move toward the right-hand side of the vibrating member 13 while receiving the load based on the clockwise rotation.

At this time, therefore, the vibrated objects 40 move on the vibrating 13 upward as viewed in FIG. 7 and also move to the right.

Figure 8:
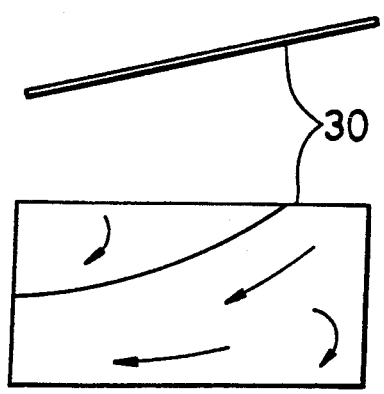

After this rightward movement has been completed, the vibrated objects 40 on the vibrating member 13 are gathered on a right-hand area thereof, and they are then moved toward the left-hand side of the vibrating member 13 while being gathered closer to the side corresponding to the bottom of FIG. 8 by the effect of opposite inclination, i.e., leftward inclination.

Thus, in accordance with the embodiment shown in FIG. 6, the vibrated objects 40 in the parts alignment tray 30 fixed to the vibrating member 13 of the vibration generator 10 are moved by the longitudinal vibration and the lateral vibration caused by the rotation of the motor 14 and by the inclination created by the inclining device 20 so as to travel over the vibrating member 13 while being brought together one-sidedly in different directions with respect to going and returning in accordance with the direction of inclination created by the inclining device 20.

Thus, the vibrated objects 40 are moved so as to be distributed generally uniformly in the parts alignment tray 30 as the vibrating member 13 continues the lateral circular vibration while the inclining device 20 repeats the rightward inclination and the leftward inclination.

The parts are therefore moved with a high degree of uniformity over the parts alignment tray 30 and are thereby aligned with all the alignment holes 31.

To align thin parts such as washers provided as the vibrated objects 40, the vibration generator 10 may generate lateral vibrations, which is not illustrated in detail.

Thus, the vibrated objects 40 are aligned with all the alignment holes 31 by flowing over the parts alignment tray 30 as shown in FIGS. 7 and 8 by the operations of the vibration generator 10 and the inclining device 20.

Figure 9:
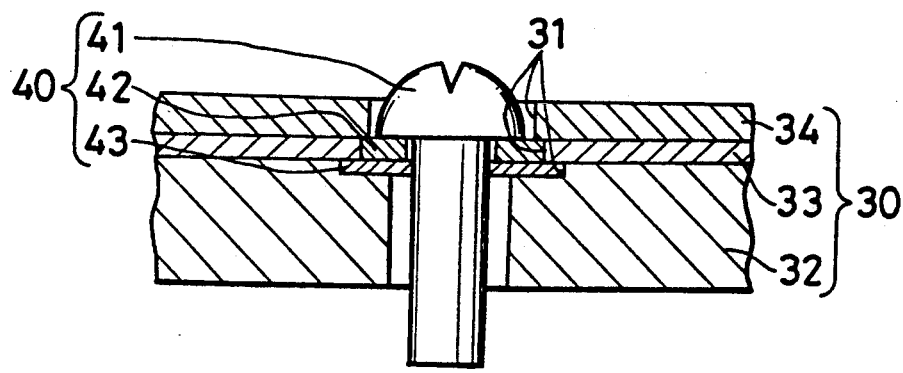
FIG. 9 is a diagram showing a case in which screws, spring washers, and flat washers provided as vibrated objects are aligned in a combined state.

FIG. 9 shows a still another embodiment which relates to a case in which screws 41, spring washers 42 and flat washers 43 provided as vibrated objects 40 are aligned in combination with each other by using the vibration parts alignment apparatus in accordance with the present invention.

In this case, three types of parts alignment tray 30: a flat washer alignment tray 32, a spring washer alignment tray 33, and a screw alignment tray 34 are prepared.

First, the flat washer alignment tray 32 is used as the parts alignment tray 30, and the flat washers 43 are aligned with the alignment holes 31. For alignment of the flat washers 43, the vibration generator 10 may generate lateral vibrations because the flat washers 43 is small in thickness. In this case, the alignment holes 31 are formed with a diameter and a depth approximately equal to the diameter and the thickness of the flat washers 43.

Next, the spring washer alignment tray 33 is positioned on the flat washer alignment tray 32 in which the flat washers 43 are aligned with the alignment holes 31. The diameter and the depth of the alignment holes 31 formed in the spring washer alignment tray 33 for alignment with the spring washers 42 are approximately equal to the diameter and the thickness of the spring washers 42. Because the diameter of the spring washers 42 is smaller than that of the flat washers 43, the flat washers 43 in the alignment holes 31 of the flat washer alignment tray 32 is pressed by the spring washer alignment tray 33.

There is therefore no possibility of the flat washers 43 in the alignment holes 31 of the flat washer alignment tray 32 jumping out at the time of alignment of the spring washers 42 with the alignment holes 31 of the spring washer alignment tray 33 effected subsequently.

The alignment of the spring washers 42 with the alignment holes 31 of the spring washer alignment tray 33 is thus effected. At this time, of the parts alignment trays 30, the spring washer alignment tray 33 is positioned on the upper surface of the flat washer alignment tray 32. In this state, the flat washers 43 and the spring washers 42 are aligned.

Thereafter, the screw alignment tray 34 is further positioned on the upper surface of the spring washer alignment tray 33 positioned on the upper surface of the flat washer alignment tray 32.

The diameter of the alignment holes 31 formed in the screw alignment tray 34 for alignment of the screws 41 is approximately equal to that of the screws 41. Therefore the spring washers 42 in the alignment holes 31 of the spring washer alignment tray 33 are pressed by the screw alignment tray 34.

There is therefore no possibility of the spring washers 42 in the alignment holes 31 of the spring washer alignment tray 33 jumping out at the time of alignment of the screws 41 with the alignment holes 31 of the screw alignment tray 34 effected subsequently.

The alignment of the screws 41 with the alignment holes 31 of the screw alignment tray 34 is thus effected. At this time, of the parts alignment trays 30, the spring washer alignment tray 33 is positioned on the upper surface of the flat washer alignment tray 32, and the screw alignment tray 34 is positioned on the upper surface of the spring washer alignment tray 33. In this state, the flat washers 43, the spring washers 42 and the screws 41 are aligned in a combined state same as the used state. For actual use, the spring washer alignment tray 33 and the screw alignment tray 34 may be removed upward to take out each set of the flat washer 43, the spring washer 42 and the screw 41.

Thus, the use of the present invention described in conjunction with FIG. 9 makes it possible to align a plurality of parts while combining them with each other as well as to simply align parts.

A similar means, which is not illustrated in detail, can be used for, for example, assembly of jacks in such a manner that jack bases are preliminarily aligned in a jack base alignment tray, the jack base alignment tray is fixed by a jack pin alignment tray, and jack pins are thereafter positioned on the jack bases, so that jacks are aligned in a combined state, thereby enabling assembly of the jacks in effect.

In relation to the above description, the cylinders 22 and 23 can be made more easy to use by being arranged to be able to gradually perform advancing or retreating operation by means of a speed controller. Further, only one cylinder may be provided which repeats inclining by advancing and retreating operations.

In the above description, the example of the inclining device 20 is based on using the cylinders. However, the inclining device 20 may be constructed with a different means such as an eccentric cam.

The above-described embodiments exemplify the cases in which circular motions are effected by utilizing the eccentric rotation of the motor 14 for the vibration generator 10. However, the vibration generator 10 may operate with a different means, for example, an eccentric cam fixed to the output shaft of the motor to convert eccentric motions caused by the eccentric cam into repeated linear motions, or utilization of advance-retreat operation of a cylinder based on magnetization and demagnetization of a solenoid to effect repeated linear motions.

INDUSTRIAL APPLICABILITY

As described above, the present invention makes it possible to align a multiplicity of parts with alignment holes of a part alignment tray in a short period of time by vibrations and reciprocative inclining motions.

What is claimed is:

1. A vibration parts alignment apparatus, comprising:
   a vibration generator;
   a tiltable means for supporting said vibration generator at a selectable inclination;
   a parts alignment tray fixedly supported by said vibration generator, said parts alignment tray having a plurality of alignment holes for alignment of parts during vibration of said vibration generator;
   a plurality of parts alignment trays are provided to enable a plurality of parts to be aligned and assembled by positioning said plurality of parts alignment trays in such a manner that one of said plurality of parts alignment trays presses and retains parts aligned in another one of said plurality of parts alignment trays placed under the former one of said plurality of parts alignment trays.

2. A vibration parts alignment apparatus according to claim 1, wherein said vibration generator comprises a vibratable support member, a frame, and flexible connecting members for connecting said vibratable support member to said frame.

3. A vibration parts alignment apparatus according to claim 1, wherein said vibration generator comprises:
   a vibratable support member;
   a frame;
   flexible connecting members for connecting said vibratable support member to said frame;
   vibration means for vibrating said vibratable support member, said vibration means comprising a motor having a shaft and an eccentric mass mounted on said shaft.

* * * * *